United States Patent
Tanida

(10) Patent No.: US 7,548,691 B2
(45) Date of Patent: Jun. 16, 2009

(54) CAMERA MODULE FOR COMBINING DISTANT IMAGE AND CLOSE IMAGE INTO SINGLE IMAGE

(75) Inventor: Katsunori Tanida, Kariya (JP)

(73) Assignee: DENSO CORPORATION, Kariya (JP)

( * ) Notice: Subject to any disclaimer, the term of this patent is extended or adjusted under 35 U.S.C. 154(b) by 393 days.

(21) Appl. No.: 11/493,902

(22) Filed: Jul. 27, 2006

(65) Prior Publication Data

US 2007/0047948 A1    Mar. 1, 2007

(30) Foreign Application Priority Data

Aug. 23, 2005   (JP)   ............... 2005-241597

(51) Int. Cl.
*G03B 41/00*   (2006.01)

(52) U.S. Cl. .................. 396/332; 396/322; 348/148; 382/104

(58) Field of Classification Search ......... 396/322, 396/332, 427; 348/143, 148, 335, 345; 382/104–106
See application file for complete search history.

(56) References Cited

U.S. PATENT DOCUMENTS

| | | | | |
|---|---|---|---|---|
| 4,801,958 | A * | 1/1989 | Stoneham ............. | 396/73 |
| 5,530,771 | A * | 6/1996 | Maekawa ............. | 382/103 |
| 6,370,261 | B1 * | 4/2002 | Hanawa ............. | 382/104 |
| 6,396,397 | B1 * | 5/2002 | Bos et al. ............. | 340/461 |
| 2002/0047898 | A1 * | 4/2002 | Mindl et al. ............. | 348/113 |
| 2002/0057341 | A1 * | 5/2002 | Tanaka ............. | 348/143 |
| 2004/0090525 | A1 * | 5/2004 | Eichmann ............. | 348/148 |
| 2004/0179125 | A1 * | 9/2004 | Nagaoka ............. | 348/335 |
| 2006/0072914 | A1 * | 4/2006 | Arai et al. ............. | 396/106 |
| 2006/0170771 | A1 * | 8/2006 | Chien et al. ............. | 348/148 |
| 2006/0222207 | A1 * | 10/2006 | Balzer et al. ............. | 382/104 |

FOREIGN PATENT DOCUMENTS

| JP | A-2001-147278 | 5/2001 |
|---|---|---|
| JP | A-2004-158017 | 6/2004 |
| JP | A-2005-225250 | 8/2005 |

OTHER PUBLICATIONS

U.S. Appl. No. 11/411,908, filed Apr. 27, 2006, Tanida.

* cited by examiner

*Primary Examiner*—W. B. Perkey
*Assistant Examiner*—Warren K Fenwick
(74) *Attorney, Agent, or Firm*—Posz Law Group, PLC

(57) ABSTRACT

A camera module is advantageously used in a vision system mounted on an automotive vehicle. The camera module includes a first optical system focused on distant objects such as a preceding vehicle and scenery in front of a vehicle and a second optical system focused on close objects such as raindrops on a windshield. The first optical system includes a first convex lens, a mirror or a half mirror and an imager, and the second optical system includes a second convex lens and a mirror. The distant image formed by the first optical system and the close image formed by the second optical system are combined into a combined image made on the imager in a single frame. The distant and close images are taken at the same time without adjusting the focuses in the camera module.

10 Claims, 5 Drawing Sheets

CAMERA MODULE FOR COMBINING DISTANT IMAGE AND CLOSE IMAGE INTO SINGLE IMAGE

CROSS-REFERENCE TO RELATED APPLICATION

This application is based upon and claims benefit of priority of Japanese Patent Application No. 2005-241597 filed on Aug. 23, 2005, the content of which is incorporated herein by reference.

BACKGROUND OF THE INVENTION

1. Field of the Invention

The present invention relates to a camera module mounted on an automotive vehicle for taking images for assisting a driver.

2. Description of Related Art

Various devices for automatically operating on-board systems are known. For example, a device for automatically turning on or off a headlight, a device for automatically operating a windshield wiper and a device for automatically detecting obstacles located in front of a vehicle have been actually used. It is necessary to provide respective sensors for these devices: a luminance sensor for the automatic lighting device, a raindrop sensor for the automatic wiper device and an ultrasonic sensor for obstacle-detecting device. To mount these various sensors on an automotive vehicle, not only a large mounting space is required but also considerably high costs and high power consumption are unavoidable.

On the other hand, various devices for assisting a driver have been proposed. For example, a device for detecting obstacles which are invisible at night, and a device for driving a vehicle at a constant speed within a predetermined driving lane have been proposed. It is necessary to provide reliable information to successfully operate these assisting devices. Image information taken by a camera device that shows many things including obstacles in front of a vehicle and lines defining a driving lane is one of the most valuable information for the assisting devices.

JP-A-2001-147278 exemplifies a device detecting raindrops through an image taken by a camera. A windshield wiper is automatically operated when the raindrops are detected. Generally, much more information is obtained from images taken by a camera device than from specific sensors such as a light sensor, a rain sensor or an ultrasonic sensor. Information obtained from images can be used in place of various pieces of information obtained from specific sensors. In this manner, the number of sensors to be mounted on a vehicle would be reduced, and mounting spaces and power consumption would be saved.

The device proposed by JP-A-2001-147278, however, detects only raindrops on a windshield because a camera used in the device is focused on the surface of the windshield. Obstacles or front vehicles cannot be detected by the camera because these are located at a certain distance from a vehicle. It could be possible to adjust the focal distance of the camera to detect both of close and distant objects. However, a certain time is required to adjust the focal distance in the camera device, which would be detrimental to safe driving.

SUMMARY OF THE INVENTION

The present invention has been made in view of the above-mentioned problem, and an object of the present invention is to provide a camera module to be mounted on a vehicle, which can take a distant image and a close image at a same time without adjusting a focal distance in the camera module.

The camera module of the present invention is advantageously applied to an image detecting device mounted on an automotive vehicle. The camera module includes a first optical system for taking an image of distant objects such as a preceding vehicle or buildings ahead and a second optical system for taking an image of close objects such as raindrops on a windshield. The first optical system includes a convex lens, a mirror or a half mirror and an imager. The second optical system includes a convex lens and a mirror. A distant image taken by the first optical system is combined with a close image taken by the second optical system, making a combined image on an imager. The combined image on the imager is converted into electronic data by picture elements disposed on the imager.

Arrangements of the components in the first and the second optical systems may be variously modified. For example, the mirror disposed between the first convex lens and the imager may be made to have a center opening through which the distant image is directly formed on the imager. In this case, the close image is made in an outer peripheral area of the distant image. The first optical system and the second optical system may be constituted by a single prism together with an interceptor for separating the distant image from the close image.

According to the present invention, the distant image and the close image are taken at the same time without adjusting focuses of the optical systems. The camera module can be made compact according to the present invention. Other objects and features of the present invention will become more readily apparent from a better understanding of the preferred embodiments described below with reference to the following drawings.

DETAILED DESCRIPTION OF THE PREFERRED EMBODIMENTS

Figure 1:
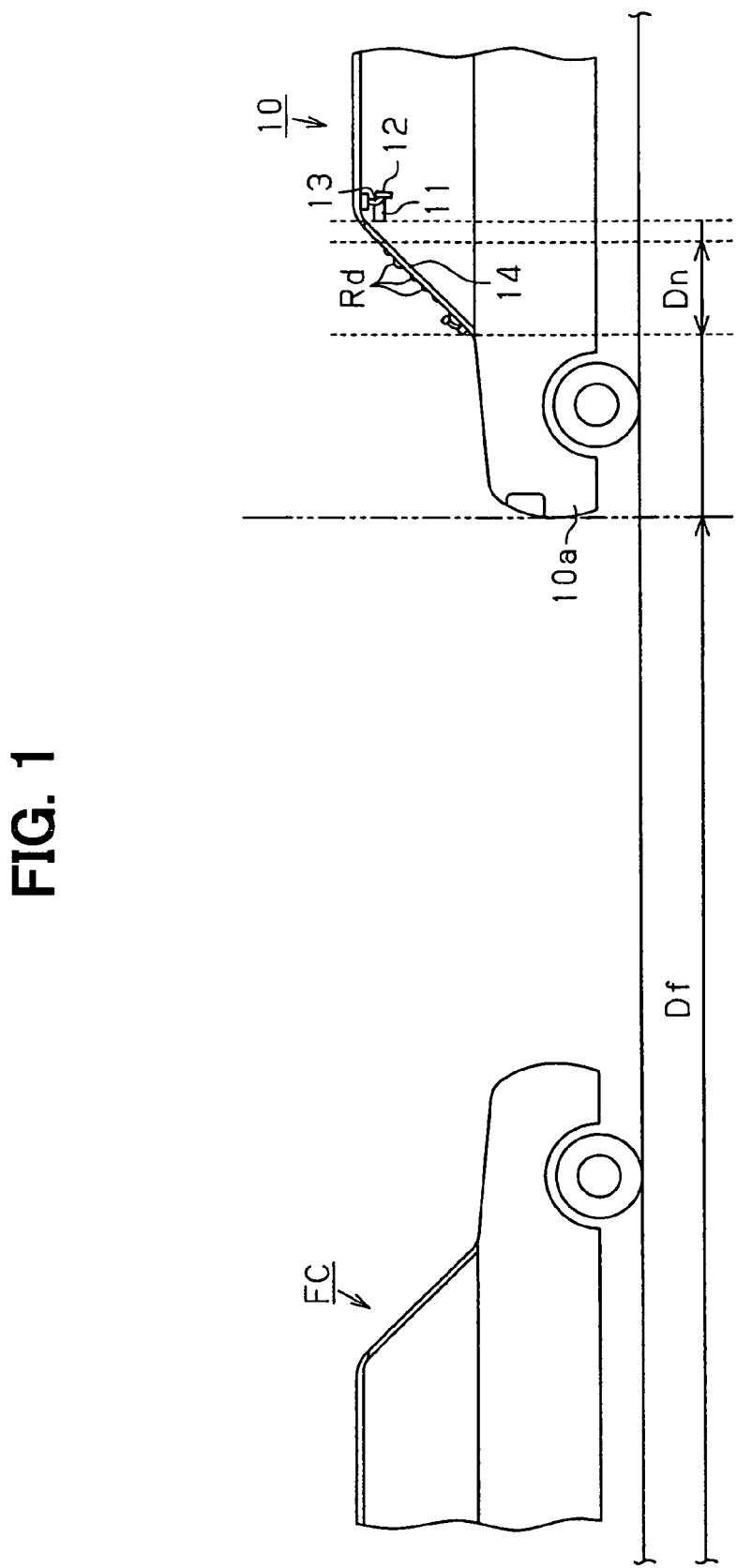
FIG. 1 is a schematic view showing a vehicle on which a camera module of the present invention is mounted and a front vehicle.

A first embodiment of the present invention will be described with reference to FIGS. 1-3. First, referring to FIG. 1, a position of a camera module 11 of the present invention mounted on a vehicle 10 will be described. The vehicle 10 on which the camera module is mounted is viewed in the horizontal direction. The camera module 11 is connected to a room mirror support 13 supporting a room mirror 12. The camera module 11 takes both of a distant image including a front vehicle FC and a front scenery and a close image showing objects such as raindrops Rd on a front surface of a windshield 14.

Figure 2:
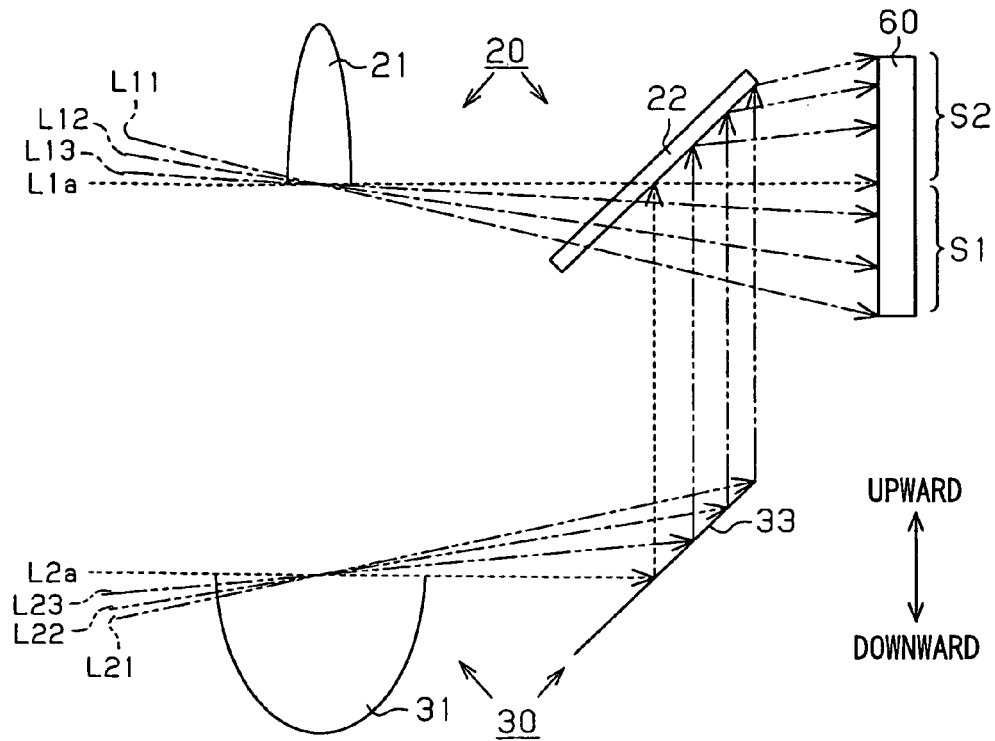
FIG. 2 is a schematic view showing an optical structure in a camera module, as a first embodiment of the present invention, viewed in a horizontal direction.

As shown in FIG. 2, the camera module 11 includes a first optical system 20 for taking the distant image S1 and a second optical system 30 for taking the close image S2. Both the first and the second optical systems are aligned in the vertical direction as shown in FIG. 2. That is, the first optical system 20 is positioned upwards and the second optical system 30 downwards. The first optical system 20 includes a first half-circular convex lens 21 focused on the distant objects, a half mirror 22, and an imager 60 on which the distant image S1 is formed through the lower half of the half mirror 22. The half mirror 22 is positioned about 45° inclined with respect to an optical axis L1a of the half circular convex lens 21.

The second optical system 30 includes a second half circular convex lens 31 focused on the front surface of the windshield 14 and a mirror 33 positioned about 45° inclined with respect to an optical axis L2a of the half circular convex lens 31. Light coming through the second half circular convex lens 31 is reflected on the mirror 33 and on an upper half of the half mirror 22, making the close image S2 on the imager 60. The half mirror 22 reflects light on the upper half thereof, and the light passes through the lower half thereof. The distant image S1 and the close image S2 are combined in a combined image.

A focal depth Df of the first convex lens 21 (refer to FIG. 1) is set to sufficiently cover the front vehicle FC (e.g., to cover a distance of several meters to several hundred meters from the vehicle 10). On the other hand, a focal depth Dn of the second convex lens 31 is set to cover raindrops on the windshield 14 (e.g., to cover a distance of several centimeters to one meter from the camera module 11). The focal depth can be adjusted, in a known manner, by changing a diaphragm of a lens.

A lower half of the distant image is cut off because the first convex lens 21 has no lower half, and only the upper half of the distant image S1 is made on the imager 60. Similarly, only a lower half close image S2 is made because the upper half of the second convex lens 31 is omitted. The light forming the upper half of the distant image S1 comes in along light paths L11, L12, L13 and passes through the lower half of the half mirror 22 and makes the distant image S1 on the imager 60 in a upside down manner. The light forming the close image S2 comes in along light paths L21, L22, L23 and reflected on the upper half of the mirror 33, and reflected again on the upper half of the half mirror 22 and makes the close image S2 in an upside-down manner. The distance image S1 and the close image S2 are formed on the imager 60 in rectangular frames, respectively, and are combined into a single rectangular frame. The combined image formed on the imager 60 is converted into image data by image elements (not shown) disposed on the imager 60 into image data.

Figure 3:
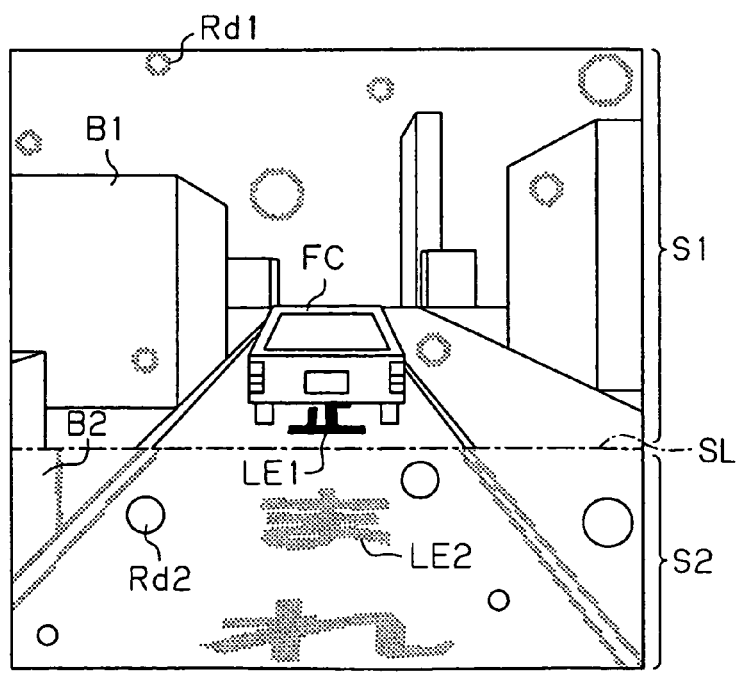
FIG. 3 is an example of a combined image taken by the camera module shown in FIG. 2.

FIG. 3 shows an example of the combined image formed on the imager 60. Though the combined image is formed on the imager 60 in an upside-down and right-left inversed manner, FIG. 3 shows the combined image with corrected directions for convenience of explanation. In the distant image S1 shown in the upper half frame, distant objects such as the front vehicle FC, a building B1 and a letter on a road LE1 are clearly shown while close objects such as the raindrops RD1 on the windshield 14 are not clearly shown. In the close image S2 shown in the lower half of the frame, the raindrops Rd2 are clearly shown while the distant objects such as a building B2 and letters on the road LE2 are not clearly shown. The distant image S1 and the close image S2 are separated by a separating line SL. This is because the focal distance of the first optical system 20 is set to the distant objects and the focal distance of the second optical system 30 is set to the close objects.

Advantages attained in the first embodiment described above are summarized below. (1) A distant image and a close image are combined in a single frame with respective clearness. (2) The camera module can be made compact by using half circular convex lenses, a half mirror and a mirror. (3) The distant image and the close image can be obtained at the same time. (4) The distant objects are clearly shown and the close objects are blurred in S1 (vice versa in S2) because respectively different focal depths are set for S1 and S2. Accordingly, both of the distant objects such as a front vehicle and the close objects such as raindrops are surely detected.

Figure 4:
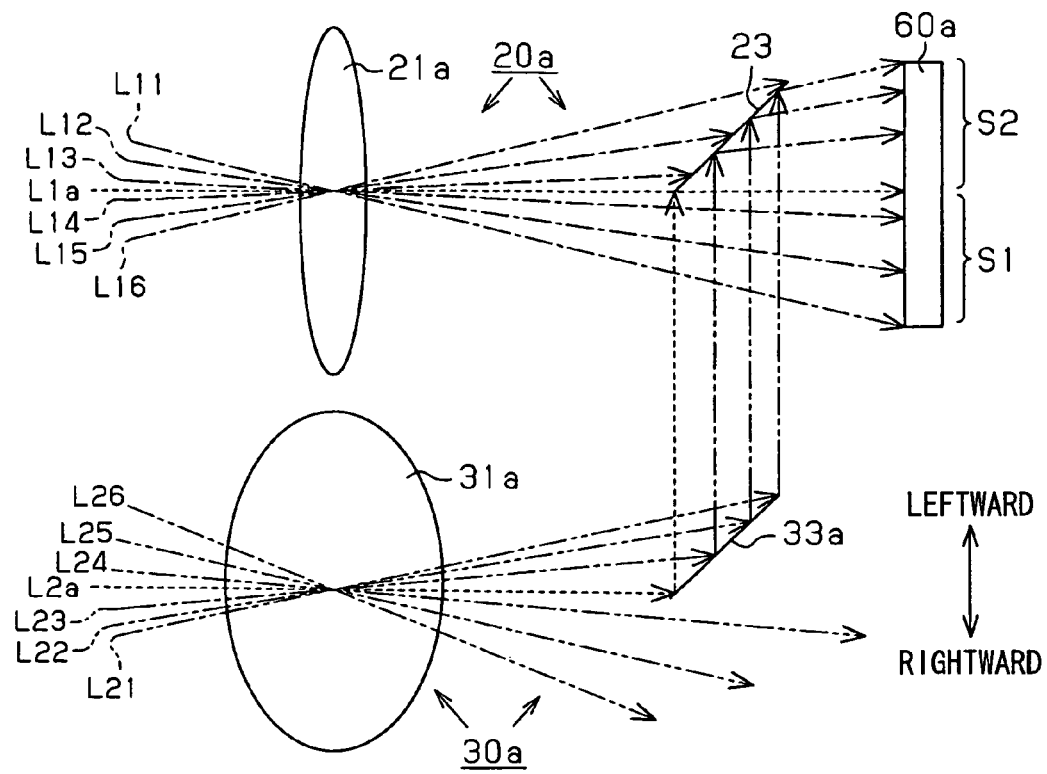
FIG. 4 is a schematic view showing an optical structure in a camera module, as a second embodiment of the present invention, viewed in a vertical direction.

A second embodiment of the present invention will be described with reference to FIGS. 4 and 5. In this embodiment, a first optical system 20a and a second optical system 30a are positioned in parallel in the horizontal direction. FIG. 4 shows the camera module 11 viewed in the vertical direction. Fully circular first and second convex lenses 21a, 31a are used in place of the half circular convex lenses 21, 31 used in the first embodiment. In place of the half mirror 22, a mirror 23 in a half size is used. Other structures are the same as those of the first embodiment. The first optical system 20a and the second optical system 30a have respectively different focal distances as in the first embodiment.

As shown in FIG. 4, light for the distant image S1 enters into the convex lens 21a along light paths L11-L16. The light corresponding to a left half of the distant objects (L11-L13) is directed to the imager 60a to make a distant image S1 thereon. The light corresponding to a right half of the distant objects (L14-L16) is intercepted by the mirror 23. On the other hand, light for the close image S2 enters into the convex lens 31a along light paths L21-L26. The light corresponding to a left half of the close objects (L24-L26) goes through without being intercepted by the mirror 33a. The light corresponding to a right half of the close objects (L21-L23) is reflected on the mirror 33a and is directed to the mirror 23. The light is reflected again on the mirror 23 to make a close image S2 on the imager 60a. In this manner, a combined image including the distant image S1 and the close image S2 is formed on the imager 60a in a rectangular frame.

Figure 5:
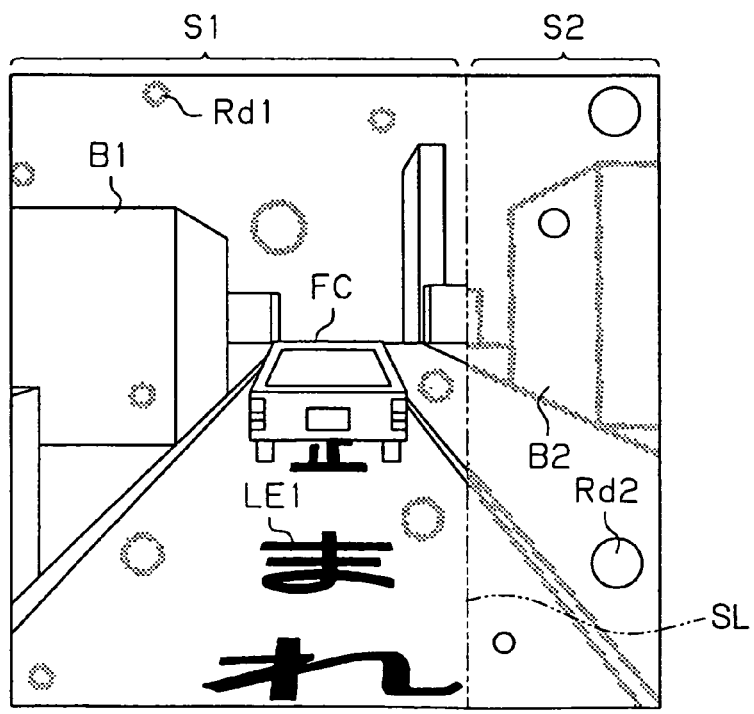
FIG. 5 is an example of a combined image taken by the camera module shown in FIG. 4.

FIG. 5 shows an example of the combined image formed on the imager 60a. The distant image S1 and the close image S2 are shown on a rectangular frame, separated by a separating line SL. In the distant image S1, a front vehicle FC, a building B1 and letters LE1 are clearly shown, while raindrops Rd1 on the windshield 14 are not clearly shown. On the other hand, in the close image S2, raindrops Rd2 on the windshield 14 are clear while a building B2 is blurred.

The following advantage is attained in the second embodiment in addition to the advantages (1), (3) and (4) attained in the first embodiment. (5) The camera module 11 can be made compact and manufactured economically by using usual convex lens 21a, 31a and a half-sized mirror 23.

A third embodiment of the present invention will be described with reference to FIGS. 6 and 7. In this embodiment, the first optical system 20b and the second optical system 30b are aligned in the vertical direction as in the first embodiment. Fully circular convex lenses 21a, 31a are used in place of the half circular lenses 21, 31, and a mirror 23a having a round center opening H is used in place of the mirror 22. Further, a full sized mirror 33 is used in place of half-sized mirror 33 used in the first embodiment. Other structures are the same as those of the first embodiment.

Light for distant objects enters into the convex lens 21a along light paths L11-L16. The light corresponding to a center portion of the distant objects (L13, L1a, L14) is directed to the imager 60b through the center opening H of the mirror 23a to make a distant image S1 on the imager 60b, while the light corresponding to other portions (L11, L12, L15, L16) is intercepted by the mirror 23a. On the other hand, all the light for the close objects (L21-L26) coming out from the convex lens 31a is reflected on the mirror 33, and is further reflected on the mirror 23a excluding its center hole H to make a distant image S2 on the imager 60b. That is, the distant image S1 is formed by the light corresponding to the center portion of the distant objects, and the close image S2 is formed by the light corresponding to a peripheral portion of the close objects.

Figure 7:
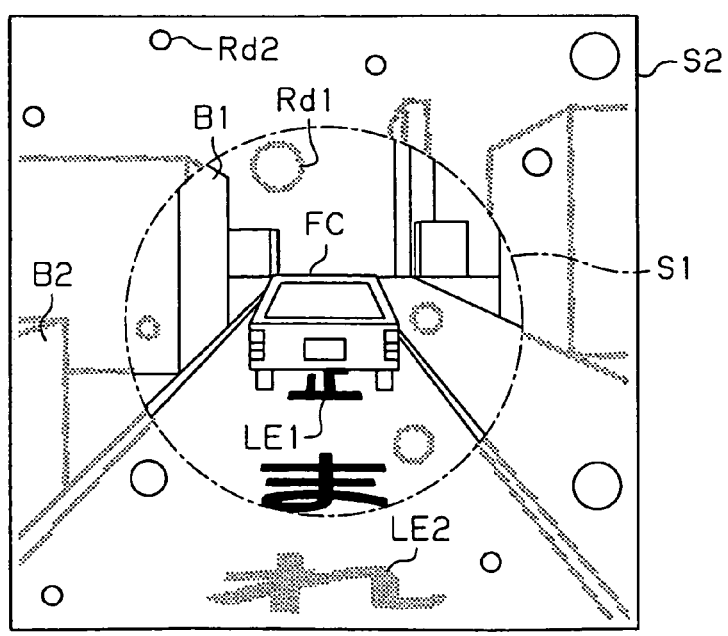
FIG. 7 is an example of a combined image taken by the camera module shown in FIG. 6.

FIG. 7 shows an example of a combined image on the imager 60b. In FIG. 7, the image made in the upside-down and left-right inversed manner is corrected to a natural image for convenience of explanation. The distant image S1 is shown in a center circular region of a frame, and the close image S2 is shown in the peripheral region surrounding the center circular region. In the distant image S1, the distant objects such as a front vehicle FC, a building B1 and letters LE1 on the road are clearly shown while the close objects such as raindrops Rd1 are blurrily shown. On the other hand, in the close image S2, the raindrops on the windshield 14 are clearly shown while the distant objects such as buildings B2 and a letter LE 2 on the road are blurrily shown. In this manner, the distant objects and the close objects are distinctly detected by the camera module 11.

The following advantage is attained in the third embodiment in addition to the advantages (1), (3) and (4) attained in the first embodiment. (6) The image S1 showing distant objects such as a front vehicle FC is clearly shown in the center circular region in the frame, and the image S2 showing close objects such as raindrops on the windshield are clearly shown in the peripheral region. This would be one of the most preferable manners for showing both images S1 and S2 in a single frame.

A fourth embodiment of the present invention will be described with reference to FIG. 8. In this embodiment, a single prism 40 and a light interceptor 50 are used in place of convex lenses and mirrors used in the foregoing embodiments. The single prism 40 constitutes the first optical system 20c for making the distant image S1 on a lower portion of an imager 60c and the second optical system 30c for making the close image S2 on an upper portion of the imager 60c. The first optical system 20c is positioned upwards and the second optical system 30c is positioned downwards. The light interceptor 50 is positioned in front of the single prism 40 to cover a front portion of the single prism 40 between an optical axis Lfa of the first optical system 20c and an optical axis Lna of the second optical system 30c.

Light for the distant objects enters into the first optical system 20c along light paths Lfa and Lfu to make a distant image S1 on the imager 60c in an upside-down manner. Light for the distant objects entering into the first optical system 20c along a light path Lfd is intercepted by the interceptor 50. On the other hand, light for the close objects such as raindrops on the windshield 14 enters into the second optical system 30c along light paths Lna and Lnd to make a close image S2 on the imager 60c in an upside-down manner. Light for the lose objects entering into the second optical system 30c along a light path Lnu is intercepted by the interceptor 50.

That is, the light for the distant objects entering into the camera module 11 from an opening above the interceptor 50 makes the distant image S1 on the imager 60c, while the light for the close objects entering into the camera module 11 from an opening below the interceptor 50 is reflected in the prism 40 to make the close image S2 on the imager 60c. Thus, an image including the distant image S1 and the close image S2 in a single frame is formed on the imager 60c. Image data are obtained through image elements (not shown) disposed on the imager 60c.

The following advantage is attained in the fourth embodiment in addition to advantages (1), (3) and (4) attained in the first embodiment. (7) The camera module 11 can be made further compact by using the single prism 40 and the light interceptor 50.

The present invention is not limited to the embodiments described above, but it may be variously modified. Some examples of the modified forms are described below. In the first embodiment shown in FIG. 2, the first and the second optical systems 20, 30 are positioned in parallel along the vertical direction. However, they may be positioned in parallel along the horizontal direction. Though the lower half of the first convex lens 21 and the upper half of the second convex lens 31 are omitted (or cut off) in the first embodiment, the omitted halves may be reversed. That is, the upper half of the first convex lens 21 and the lower half of the second convex lens 31 may be omitted.

Figure 9:
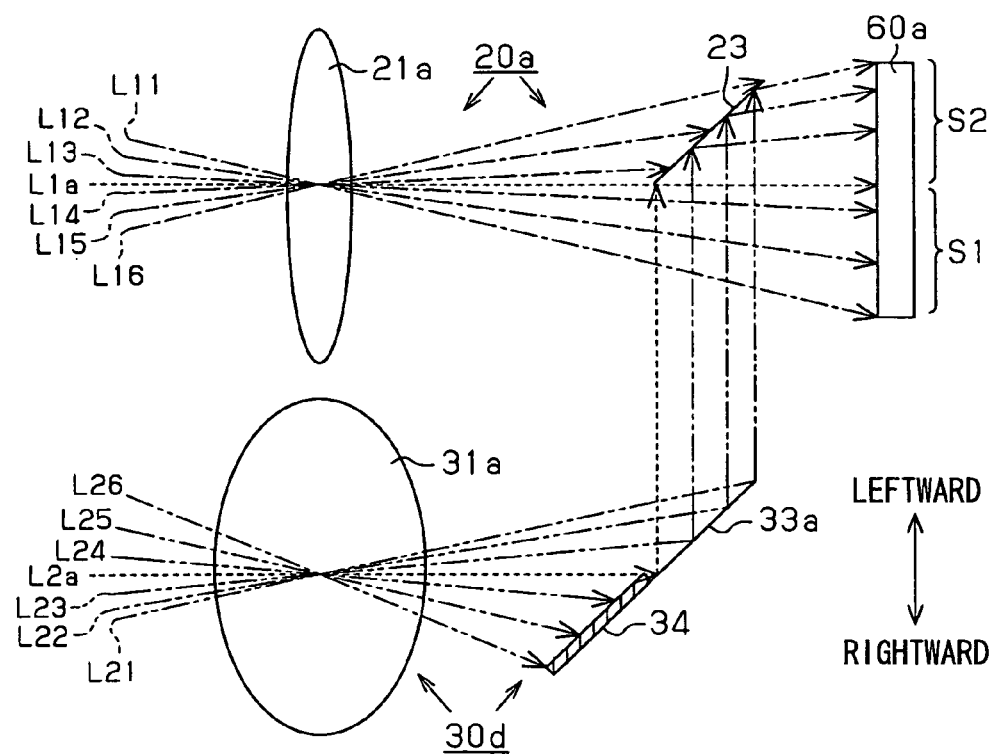
FIG. 9 is a schematic view showing an optical structure in a camera module, as a modified form of the second embodiment of the present invention, viewed in a vertical direction.

In the second embodiment shown in FIG. 4, the half-sized mirror 33a is used to reflect only the light corresponding to the right half of the close objects. The half-sized mirror 33a may be replaced with a full-sized mirror having a portion covered with an intercepting film 34, as shown in FIG. 9. The second convex lens 31a and the mirror 33a having the intercepting film 34 constitute the second optical system 30d in this modified form. The distant image S1 and the close image S2 are combined on the imager 60a in the same manner as in the second embodiment. In the second embodiment shown in FIG. 4 and its modified form shown in FIG. 9, the first optical system 20a is positioned leftward and the second optical system 30a (30d) rightward. However, the horizontal positions of the both systems may be reversed. Further, both systems may be positioned in parallel along the vertical direction.

Figure 6:
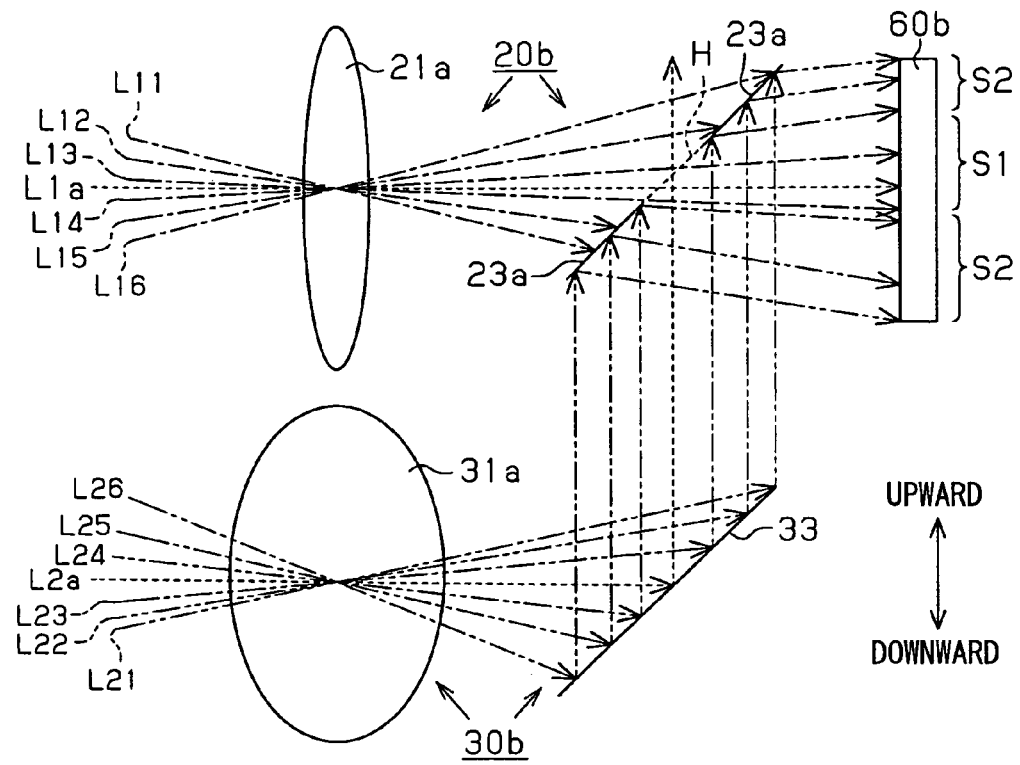
FIG. 6 is a schematic view showing an optical structure in a camera module, as a third embodiment of the present invention, viewed in a horizontal direction.

In the third embodiment shown in FIG. 6, the mirror 23a having a round center opening H is used. However, the shape of the center opening is not to limited to the round shape, but it may be variously changed (e.g., a triangle, square, etc.) In the first to the third embodiments, the mirror or the half mirror is positioned about 45° inclined with respect to the optical axis. However, the inclination is not limited to 45 degree, but it may be variously changed as long as the distant image S1 and the close image S2 can be formed on a single imager by partially utilizing lights from the distant and close objects.

Figure 8:
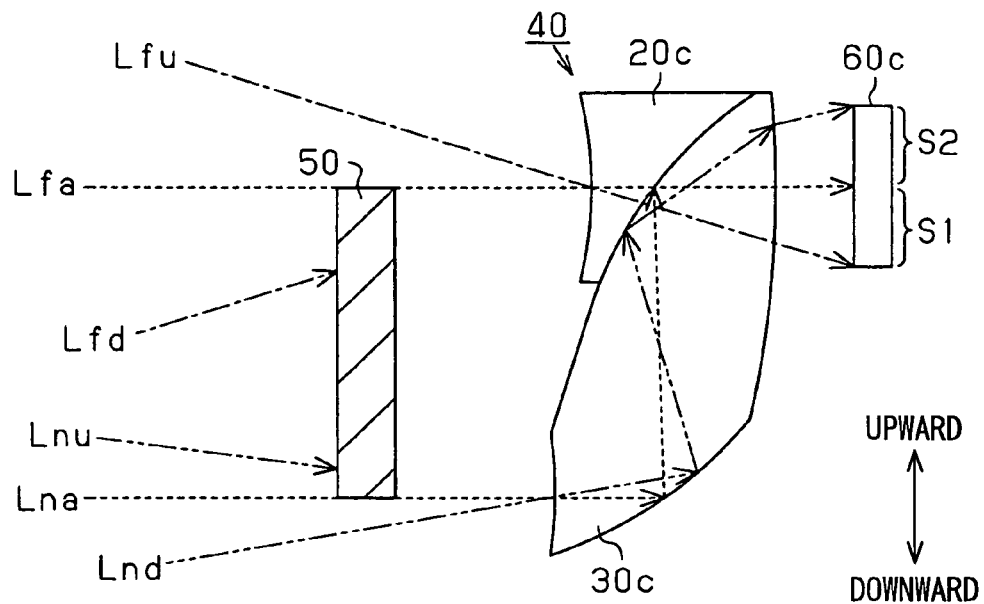
FIG. 8 is a schematic view showing an optical structure in a camera module, as a fourth embodiment of the present invention, viewed in a horizontal direction.

In the fourth embodiment of the present invention shown in FIG. 8, the camera module 11 is mounted on the vehicle 10 so that a portion of the prism 40 constituting the first optical system 20c is positioned upwards. However, the camera module may be rotated 90° or 180° around the optical axis Lfa. The combined image including the distant image S1 and the close image S2 is similarly formed on the imager 60c.

The separating line SL, shown in FIG. 3, separating the distant image S1 and the close image S2, may be moved up or down by moving the lens, mirror or half mirror shown in FIG. 2. If it is desired, for example, to further improve detection accuracy of the raindrops Rd2, the separating line SL is moved up to enlarge an area of the close image S2. On the other hand, an area of the distant image S1 can be enlarged to improve detection accuracy of the distant objects. The separating line SL shown in FIG. 5 can be moved rightward or leftward in the similar manner.

In the foregoing embodiments, the focus of the first optical system is set to distant objects including preceding vehicles and buildings ahead, while the focus of the second optical system is set to close objects such as raindrops on the windshield. However, the focal distances are not limited to those described above. The focal distances of two optical systems can be set to those different from each other. The camera module of the present invention may be used in systems other than automotive vehicles. For example, it may be used in an industrial camera system or a crime-preventing system.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A camera module comprising:

a first optical system including a first convex lens having a first focal distance, a half mirror positioned behind the first convex lens at an inclination relative to an optical axis of the first convex lens, part of light coming out from the first convex lens passing through the half mirror, and an imager positioned behind the half mirror and a second optical system including a second convex lens having a second focal distance which is different from the first focal distance and a mirror positioned behind the second convex lens at an inclination relative to an optical axis of the second convex lens, part of light coming out from the second convex lens being reflected on the mirror toward the half mirror so that the light reflected on the mirror is further reflected on the half mirror, wherein:

a single image is made on the imager by combining a first image formed by the light passing through the half mirror with a second image formed by the light reflected on the half mirror, the first image and the second image being formed at the same time.

2. A camera module comprising:

a first optical system including a first convex lens having a first focal distance, a first mirror positioned behind the first convex lens at an inclination relative to an optical axis of the first convex lens, part of light coming out from the first convex lens being intercepted by the first mirror and the rest of the light being led ahead without being intercepted by the first mirror, and an imager positioned behind the first mirror and a second optical system including a second convex lens having a second focal distance which is different from the first focal distance and a second mirror positioned behind the second convex lens at an inclination relative to an optical axis of the second convex lens, part of light coming out from the second convex lens being reflected on the second mirror toward the first mirror so that the light reflected on the second mirror is further reflected on the first mirror, wherein:

a single image is made on the imager by combining a first image formed by the light led ahead without being intercepted by the first mirror with a second image formed by the light reflected on the first mirror, the first image and the second image being formed at the same time.

3. A camera module comprising:

a first optical system including a first convex lens having a first focal distance, a first mirror positioned behind the first convex lens at an inclination relative to an optical axis of the first convex lens, the first mirror having a center opening through which part of light coming out from the first convex lens passes, the rest of the light coming out from the first convex lens being intercepted by the first mirror, and an imager positioned behind the half mirror and a second optical system including a second convex lens having a second focal distance which is different from the first focal distance and a second mirror positioned behind the second convex lens at an inclination with respect to an optical axis of the second convex lens, light coming out from the second convex lens being reflected on the second mirror toward the first mirror so that the light reflected on the second mirror is further reflected on the first mirror other than the center opening, wherein:

a single image is made on the imager by combining a first image formed by the light passing through the center opening of the first mirror with a second image formed by the light reflected on the first mirror, the first image and the second image being formed at the same time.

4. A camera module comprising:

a prism forming a first optical system and a second optical system therein, the first optical system having a first focal distance and passing light from the first focal distance therethrough, the second optical system having a second focal distance which is different from the first focal distance and reflecting light form the second focal distance, an interceptor positioned in front of the prism, the interceptor dividing light entering the camera module into a first part entering into the first optical system and the second part entering into the second optical system, and an imager positioned behind the prism for making an image thereon, wherein:

a single image is made on the imager by combining a first image formed by the light passing through the first optical system with a second image formed by the light reflected in the second optical system, the first image and the second image being formed at the same time.

5. The camera module as in claim 1, wherein:
the camera module is mounted on an automotive vehicle;
the first focal distance is set to distant objects located in front of the automotive vehicle; and
the second focal distance is set to close objects located on a front surface of a windshield of the automotive vehicle.

6. The camera module as in claim 2, wherein:
the camera module is mounted on an automotive vehicle;
the first focal distance is set to distant objects located in front of the automotive vehicle; and
the second focal distance is set to close objects located on a front surface of a windshield of the automotive vehicle.

7. The camera module as in claim 3, wherein:
the camera module is mounted on an automotive vehicle;
the first focal distance is set to distant objects located in front of the automotive vehicle; and
the second focal distance is set to close objects located on a front surface of a windshield of the automotive vehicle.

8. The camera module as in claim 4, wherein:
the camera module is installed on an automotive vehicle;
the first focal distance is set to distant objects located in front of the automotive vehicle; and
the second focal distance is set to close objects located on a front surface of a windshield of the automotive vehicle.

9. The camera module as in claim 1, wherein:
the first convex lens is formed in a half circular shape so that part of the light coming out from the first convex lens passes through the half mirror; and
the second convex lens is formed in a half circular shape so that part of the light coming out from the second convex lens is reflected on the mirror.

10. The camera module as in claim 2, wherein:
an intercepting film is formed on the second mirror so that part of the light coming out from the second convex lens is intercepted by the intercepting film.

* * * * *